(12) United States Patent  (10) Patent No.: US 8,533,645 B2
Klass  (45) Date of Patent: Sep. 10, 2013

(54) REDUCING NARROW GATE WIDTH EFFECTS IN AN INTEGRATED CIRCUIT DESIGN

(75) Inventor: Edgardo F. Klass, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 161 days.

(21) Appl. No.: 13/097,537

(22) Filed: Apr. 29, 2011

(65) Prior Publication Data

US 2012/0274357 A1  Nov. 1, 2012

(51) Int. Cl.
G06F 17/50 (2006.01)
(52) U.S. Cl.
USPC .......................................... 716/110
(58) Field of Classification Search
USPC .......................................... 716/110
See application file for complete search history.

(56) References Cited

U.S. PATENT DOCUMENTS

| 6,209,122 | B1 * | 3/2001 | Jyu et al. ................. 716/113 |
| 7,596,775 | B2 | 9/2009 | Tsien et al. |
| 2004/0243957 | A1 * | 12/2004 | Mandry ............................ 716/6 |
| 2007/0226660 | A1 * | 9/2007 | Ogawa .............................. 716/2 |
| 2009/0199136 | A1 | 8/2009 | Reis et al. |
| 2009/0271756 | A1 | 10/2009 | Penzes |
| 2010/0162191 | A1 | 6/2010 | McCracken |
| 2011/0041114 | A1 | 2/2011 | Komatsu |

* cited by examiner

*Primary Examiner* — Jack Chiang
*Assistant Examiner* — Brandon Bowers
(74) *Attorney, Agent, or Firm* — Meyertons, Hood, Kivlin, Kowert & Goetzel P.C.; Stephen J. Curran

(57) ABSTRACT

A method for reducing narrow gate width effects in an integrated circuit includes finding the smallest transistor channel widths that are larger than the minimum width for the technology for library cells that produce logic blocks that meet timing constraints while using the least amount of power and have the smallest possible area. The method may include characterizing a device library while varying process, voltage and temperature parameters, and synthesizing an HDL representation of a functional logic block including cells from the device library. The method may also include determining whether timing, area, and power values of the functional logic block are within a predetermined range. In response to the timing, area, and power values not being within the predetermined range, iteratively increasing the channel width of at least a portion of the transistors of at least one of the cells in the device library.

9 Claims, 6 Drawing Sheets

REDUCING NARROW GATE WIDTH EFFECTS IN AN INTEGRATED CIRCUIT DESIGN

BACKGROUND

1. Technical Field

This disclosure relates to integrated circuits, and more particularly to transistor sizing.

2. Description of the Related Art

Integrated circuit designers use libraries that include the devices that will be used during the design of the integrated circuit. More particularly, once the circuit has been logically proven, the design is then synthesized according to the particular manufacturing facility and technology that will be used. The technology typically refers to the minimum transistor sizes (e.g., channel length and width) that the facility can reliably manufacture. It is generally considered advantageous to make devices as small as possible (i.e., scaling) since more devices may be fit onto an integrated circuit, and thus more integrated circuit die may fit onto a wafer, which reduces the cost of making the integrated circuit. In addition, as devices scale, the switching speed of the devices also generally decreases.

However, although there are advantages to manufacturing devices at the smallest possible size that a given technology will support, in some cases there may be drawbacks. For example, narrow width effects have been observed in integrated circuits for quite some time. As device geometries have continued their downward trend these effects have become more prominent. One notable effect is that as the channel width decreases well below 0.4 microns, and certainly below 100 nm, the threshold voltage (Vt) sharply increases even in devices that employ shallow trench insulator (STI) technology. For devices that will be used at an operating voltage that is well above the Vt, this may not be an issue. However, along with decreases in device size, has been a reduction in the operating voltage. Accordingly, as the operating voltage decreases and Vt increases, at some point the increase in Vt becomes too large for a given operating voltage and the device may be difficult to turn on or to operate reliably. This may be especially problematic in view of device variability due to process, voltage, and temperature (PVT) variations across an integrated circuit die or wafer.

SUMMARY OF THE EMBODIMENTS

Various embodiments of a method for reducing narrow gate width effects in an integrated circuit design are disclosed. Broadly speaking, a method is contemplated for finding the smallest possible transistor channel widths for library cells that produce logic blocks that meet timing constraints while using the least amount of power and have the smallest possible area. The smallest channel width that can best meet the design criteria is not always the minimum width for the technology.

In one embodiment, the method includes creating an integrated circuit device library that includes one or more cells. Each cell may have a number of transistors. Each of the transistors may be specified to have a minimum channel width that may be determined by the manufacturing capability of a particular manufacturing facility within which the integrated circuit may be manufactured. The method may also include characterizing the device library while varying process, voltage and temperature parameters, and synthesizing a hardware description language representation of functional logic block including cells from the device library. The method may also include assessing timing, area, and power values for the functional logic block, and modifying the transistor channel width responsive to the values found by assessing. Depending on the timing, area, and power values, the method may include repeating the characterizing, synthesizing, assessing, and modifying to identify a particular transistor channel width for which the timing value of the functional logic block meets a timing goal and for which the area and power values are minimized among the attempted transistor channel widths.

In one specific implementation, the method may include iteratively increasing the transistor channel width of at least a portion of the transistors of at least one of the cells in the device library, and repeating the characterizing, synthesizing, assessing to identify the particular transistor channel width.

In another embodiment, an integrated circuit includes a logic circuit including one or more standard library cells. Each of the cells may include a number of transistors. Each of the transistors may have a new minimum transistor channel width that is larger than a minimum transistor channel width determined by a manufacturing capability of a particular manufacturing facility within which the integrated circuit is manufactured.

Figure 1:
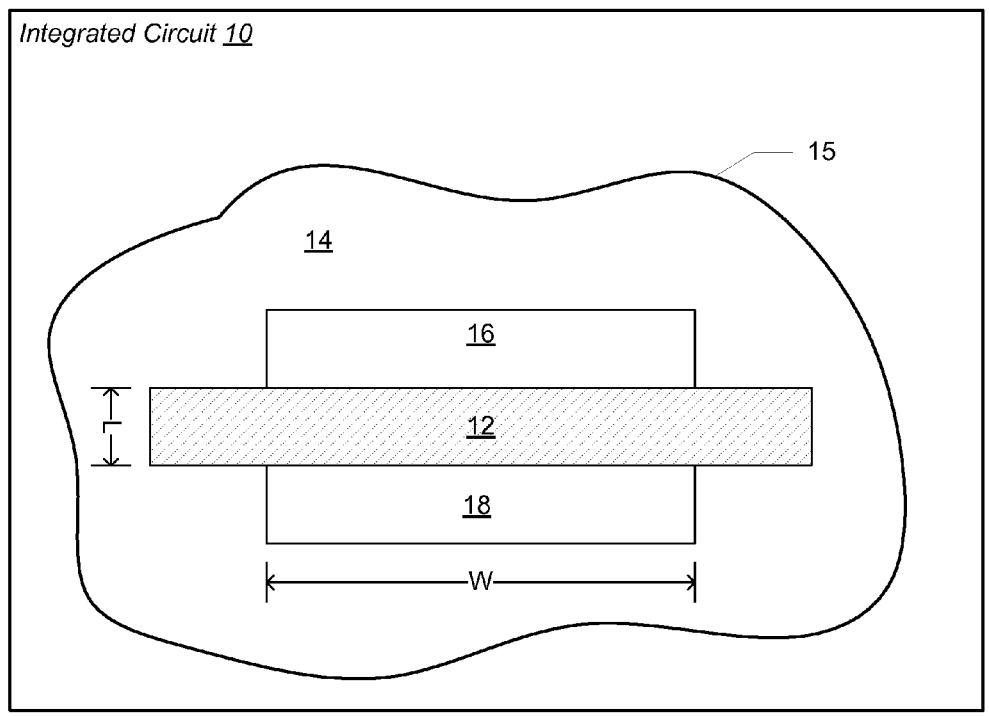
FIG. 1 is a diagram depicting a top down layout view of one embodiment of an integrated circuit transistor.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Turning now to FIG. 1, a diagram depicting a top down layout view of one embodiment of an integrated circuit (IC) transistor is shown. The IC 10 includes a transistor 15. In the illustrated embodiment, transistor 15 includes a gate region 12, a drain region 16, a source region 18, and an isolation region 14. As shown, the transistor length refers to the channel length, which is the region under the gate 12 between the source 18 and the drain 18, and is represented by the dimension 'L'. The transistor width refers to the channel width, which as the name implies refers to the width of the region under the gate 12 and is represented by the 'W' dimension. It is noted that transistor 15 is not drawn to scale, and that the dimensions shown in FIG. 1 are for discussion purposes only.

As previously mentioned, a device technology typically refers to the minimum transistor sizes (e.g., channel length and width) that the facility can reliably manufacture.

For example, a 32 nm (i.e., $32 \times 10^{-9}$ meters) technology may refer to the minimum transistor channel length. In such a technology, the minimum transistor channel width may be 80 nm. In addition, in certain cases it may not be desirable to manufacture ICs at the minimum geometries due to various phenomenon such as narrow width effects, for example. However, it may not be efficient to create fully custom logic when creating an IC. Accordingly, as described in greater detail below, an IC design library may be created that uses non-minimum sized transistors for a given technology. In this way, standard cell logic may be used that provides logic gates that may either completely or partially utilize non-minimum sized transistors to achieve a design that meets timing with efficient area and power characteristics.

Figure 2:
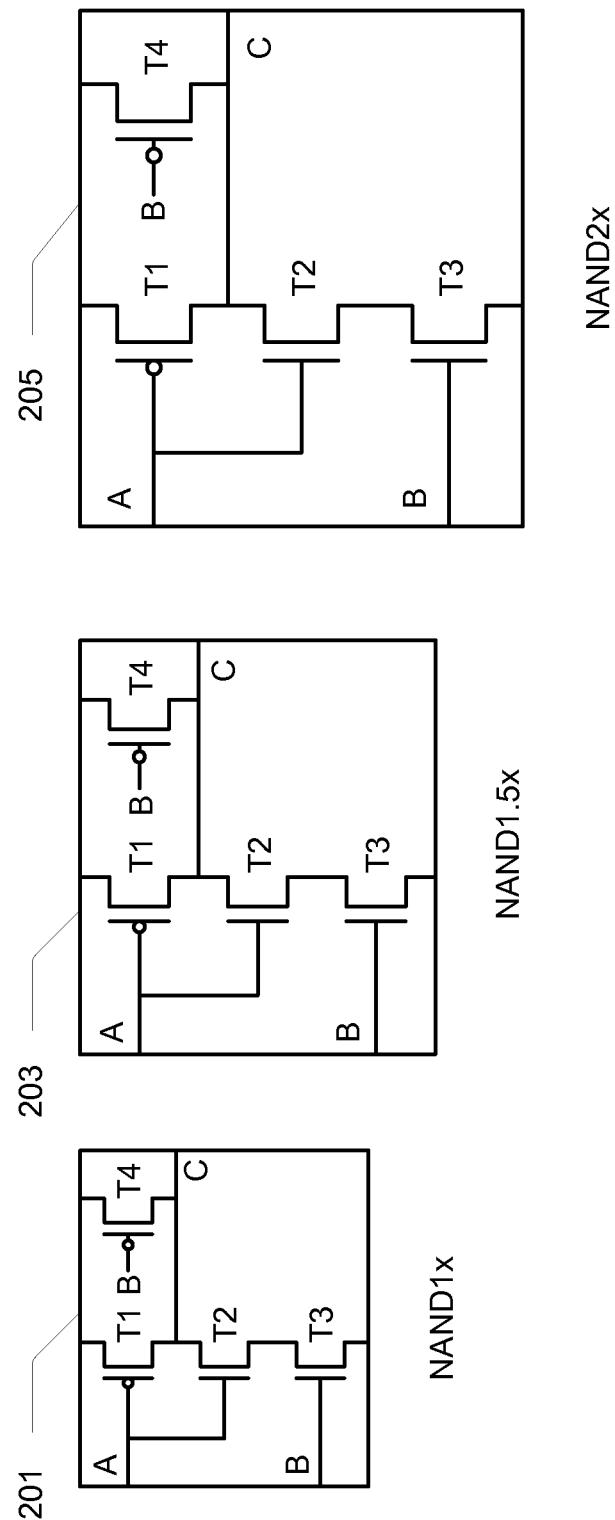
FIG. 2 is a diagram depicting various versions of an embodiment of a logic gate having different sizes of non-minimum sized transistors.

Turning to FIG. 2, a diagram depicting various versions of an embodiment of a logic gate having different sizes of non-minimum sized transistors is shown. In the illustrated embodiment, there are three versions of a NAND-gate shown. The three versions differ in their relative size and drive strength. More particularly, the first version, NAND-gate 201, is labeled as NAND1x. Similarly, the second version (e.g., NAND-gate 203) is labeled as NAND1.5x, and the third version (e.g., NAND-gate 205) is labeled as NAND2x. The 'x' refers to the minimum size (i.e., width) of the transistors used in the NAND-gate. As described above, the minimum size for a particular technology may be the minimum size that may be manufactured at that particular facility. For example, the minimum channel width for the particular technology may 80 nm. However, as described further below that minimum channel width may not be the best size to use due to area and power inefficiencies. Accordingly, for an IC designer to have access to standard cell logic gates in a device library that has non-minimum sized transistors, the device library may need to be resized/recreated/recharacterized. Thus, in the modified device library, the 'x' may refer to a new minimum size (or base size) which is larger than the minimum size that may be manufactured. For example, the new minimum width may be 90 nm. Thus, the 1.5x refers to 1.5(90) for a recreated device library. This is different than a conventional library that includes logic cells that are 1.5x, 2x, etc., for example, where 'x' is the minimum size for the particular technology.

Figure 3:
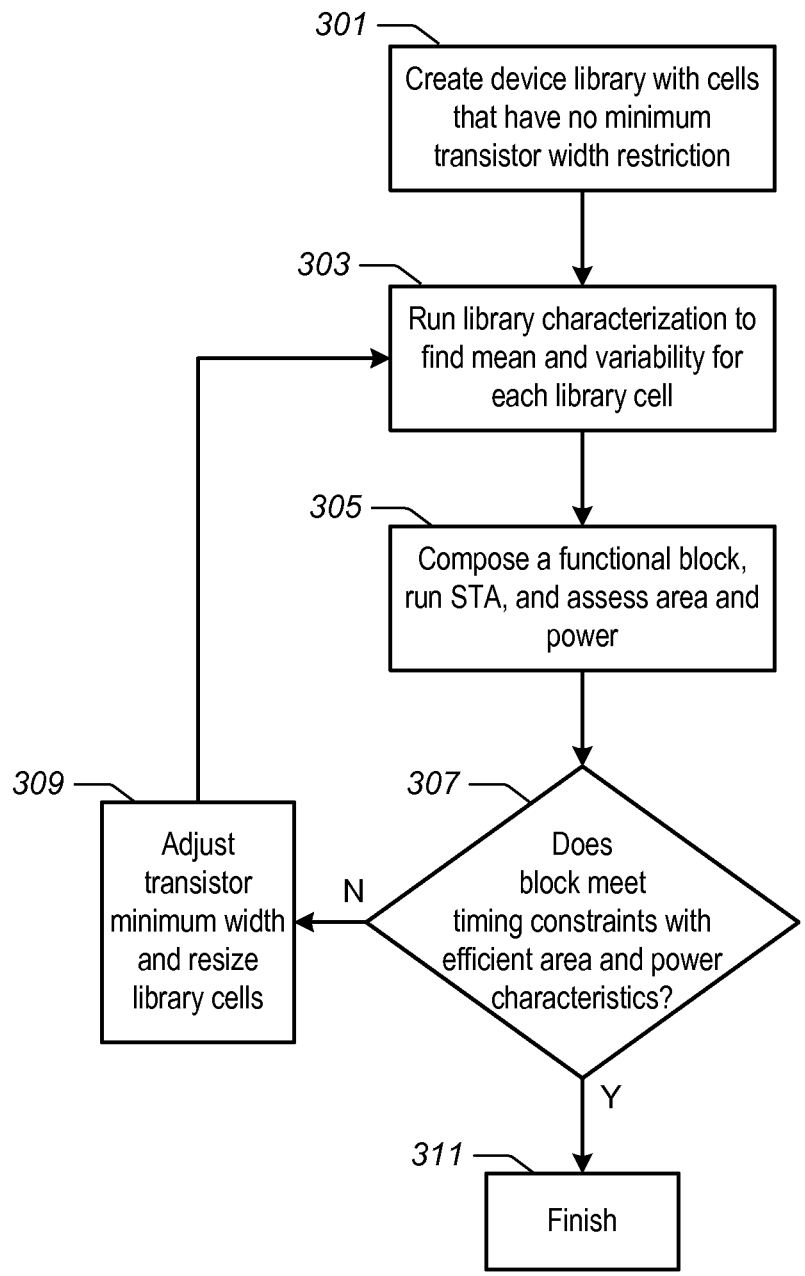
FIG. 3 is a flow diagram describing an embodiment of a method for finding a transistor width for non-minimum sized transistors for use in logic in an integrated circuit design library.

Turning to FIG. 3, a flow diagram describing an embodiment of a method for finding the transistor width for non-minimum sized transistors for use in logic in an integrated circuit design library is shown. Beginning in block 301, in one embodiment a device library is created that may have no minimum transistor width restrictions. More particularly, as a starting point a device library may be created that includes logic gates or cells having the minimum device size for the technology. For example, when there is a technology shift or if a process is moved to a new fabrication facility, the new library with minimum sized devices may be used as a starting point for a design. Accordingly, the logic gates that are needed are created and placed in the library.

When the library is complete, a library characterization process is run. During the library characterization, various timing and delay parameters may be measured for each gate or cell in the library as the process, voltage, and temperature (PVT) is varied to cover the PVT corners and a number of additional PVT points. For example, the propagation delay may be measured from every input to the output of each cell, and the rise and fall times for each transition of each cell may be measured across all the desired PVT points. Once the measurements are taken, the mean and variability values are found for each cell in the library (block 303).

Once the library has been characterized, the IC designer may compose or create a functional block of logic to use as a test block. The timing, area and power for the functional block may be obtained through logic synthesis, place and route, and circuit simulation, respectively (block 305). It is noted that the functional block may be a new logic block that may be used solely for testing the device library. Alternatively, the functional block may be a logic block that is part of a current design or a previous design. In one embodiment, the functional block may correspond to a hardware description language (HDL) representation of a circuit block, and may be written using register transfer level (RTL), for example. The RTL may be synthesized into a gate level description (e.g., netlist) using a logic synthesis tool. Timing analysis such as static timing analysis (STA) or statistical timing analysis may be performed on the netlist to determine setup and hold times, path delays and other timing related information based upon the mean and variability values from the library characterization using an STA tool. With the timing information, the area and power values may be obtained for the functional block. More particularly, in one embodiment, the block area information may be obtained from performing place and route operation on the netlist using a place and route tool. Similarly, block power may be obtained by running circuit simulation on the netlist using a simulation tool such as SPICE, for example.

Once the functional block meets timing, the block area and power characteristics are assessed. If the functional block meets the desired timing with an efficient area and power (block 307), then the device in the library are sufficiently sized and the process is complete (block 311). In one embodiment, the design goal is to have the smallest possible design while consuming the smallest amount of power while still meeting timing. However as described above, using the smallest transistor widths do not always produce a block with the smallest area because in some cases these small devices may be negatively affected by variability at the low operating voltages, causing additional buffers to be placed into the design to increase drive strength, thereby growing the block area and power. By contrast, if the channel width is increased to overcome the variability issues, many of the additional buffers may be removed, which reduces the overall block area and power. Thus, to achieve the design goal, finding the channel width that may yield the best combination of area and power while still meeting timing is performed.

Accordingly, if the functional block area and/or power are not within the predetermined range or value, the transistor channel widths of the devices in the library may be adjusted. To begin with the channel widths may be increased by a predetermined amount and each of the cells, or at least some of the cells in the library are resized accordingly (block 309). More particularly, the channel widths may be increased incrementally. In one embodiment, an increment may be a minimum gate width or any integer multiple of a minimum gate width for the technology. For example, if the technology supports a minimum gate width of 80 nm, one increment may be 80 nm, 160 nm, etc. However, in other embodiments, the width may be increased by any suitable fractional amount of the minimum width. Thus, in the above example, the width may be incremented by 10 nm or 20 nm, as desired.

After resizing the affected library cells, the device library is characterized again using the new minimum transistor widths to find the mean and variability as described above in block 303. Similarly, the functional block is again synthesized and simulated using the resized library values as described in block 305. This process may be repeated until a so-called design "sweet spot" is found for the functional block. The functional block must meet timing, but with the most efficient combination of area and power. Thus the sweet spot refers to restricting the use of the minimum width devices to find an optimal channel width that may provide the smallest possible devices, while having the smallest block area, with the lowest power consumption, and at a desired operating voltage. Thus, the sweet spot may provide a device channel width that allows the area and power values to fall within some acceptable predetermined range of values. Accordingly, to find the sweet spot may preclude the use of transistor widths that are smaller than a particular width that is larger than the minimum width supported by the technology, except in certain cases as described below.

Figure 5:
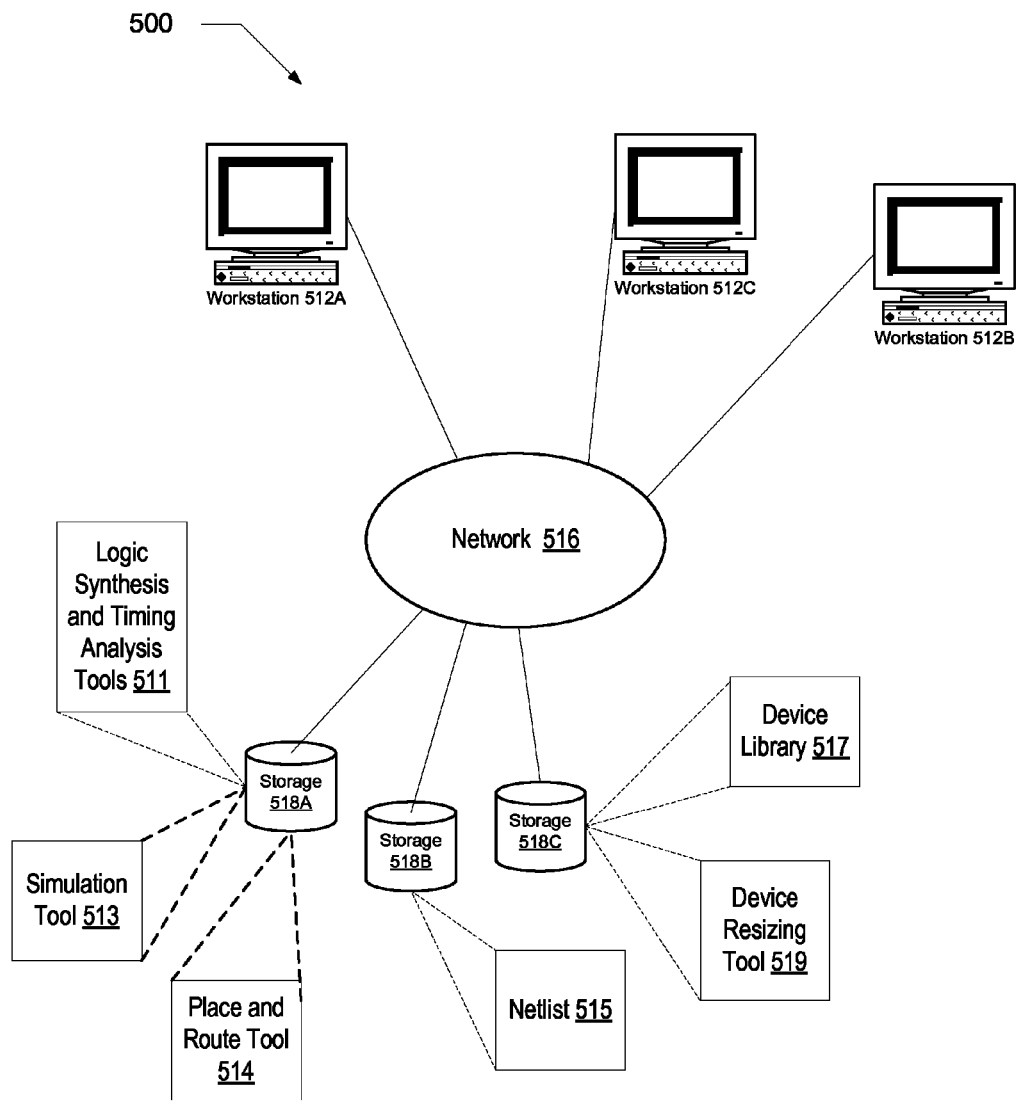
FIG. 5 is a block diagram of an embodiment of a computer system including design tools and a design library used to design an integrated circuit.

It is noted that the above process may be performed manually by the IC designer on a computer. In other words, each of the steps may be run separately, and independently. Alternatively, at least a portion of the process may be performed in an automated way using one or more software routines written in a scripting language, for example, which cause each of the process steps to occur. More particularly, in one embodiment, a script may be run that causes each tool to execute and the script may pass variables and information to each tool for the tools to run. Such software routines may be collectively referred to as a device resizing tool as shown in FIG. 5.

Figure 4:
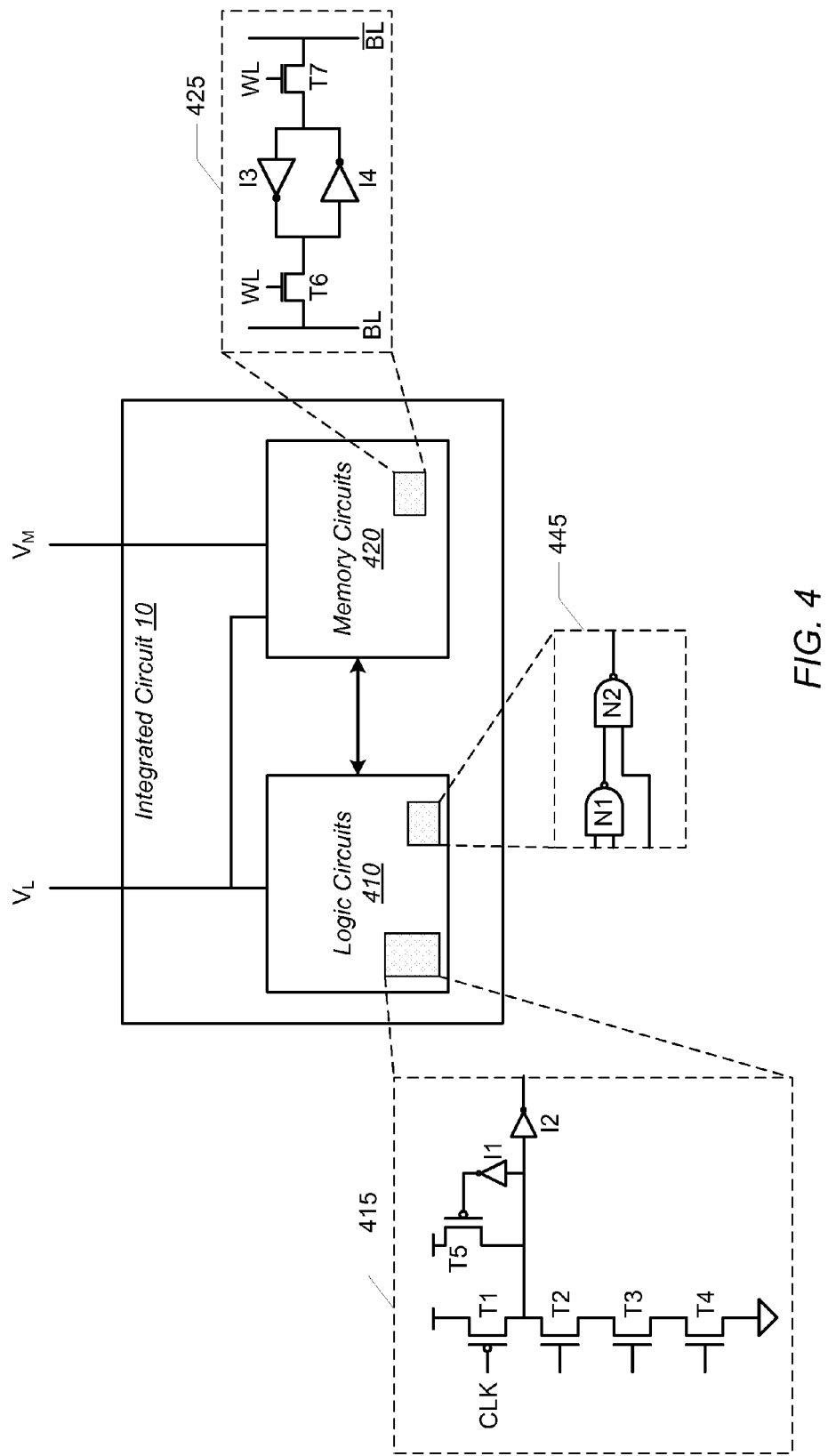
FIG. 4 is a block diagram illustrating an integrated circuit including logic that has both non-minimum sized and minimum sized transistors.

Referring to FIG. 4, a block diagram of another embodiment of the integrated circuit of FIG. 1 is shown. In the illustrated embodiment, the integrated circuit 10 includes a plurality of logic circuits 410 and a plurality of memory circuits 420. The logic circuits 410 are coupled to the memory circuits 420. The logic circuits 410 are powered by a first supply voltage (designated as $V_L$) provided to the integrated circuit 10. The memory circuits 420 are powered by a second power supply voltage (designated as $V_M$) provided to the integrated circuit 10. The integrated circuit 10 may generally comprise the logic circuits 410 and the memory circuits 420 integrated onto a single semiconductor substrate (or chip).

The logic circuits 410 may generally implement the operation for which the integrated circuit is designed. The logic circuits 410 may generate various values during operation, which the logic circuits 410 may store in the memory circuits 420. Additionally, the logic circuits 410 may read various values from the memory circuits 420 on which to operate. For example, in various embodiments, the memory circuits 420 may include memory used for caches, register files, integrated-circuit-specific data structures, etc. The memory circuits 420 may implement any type of readable/writeable memory. In one embodiment, the memory circuits 420 may be implemented as static random access memory (SRAM). It is noted that, while the illustrated embodiment includes a plurality of logic circuits 410 and a plurality of memory circuits 420, various embodiments may include at least one logic circuit 410 and at least one memory circuit 420.

By separating the supply voltage for the logic circuits 410 and the memory circuits 420, the supply voltage for the logic circuits 410 ($V_L$) may be reduced below the level at which the memory circuits 420 may operate robustly. The supply voltage for the memory circuits 420 ($V_M$) may be maintained at the minimum supply voltage that provides for robust memory operation (or greater, if desired). Thus, in some embodiments, the $V_L$ supply voltage may be considerably less than the $V_M$ supply voltage during use. Generally, a supply voltage may be a voltage provided to a circuit to power the circuit, providing the electrical energy to permit the circuit to generate one or more outputs responsive to one or more inputs.

Accordingly, to operate properly, most of the circuits within logic circuits 410 are implemented using the non-minimum width logic cells in the device library as described above. For example, a small portion of logic circuits 410 is shown as circuit 445. The NAND-gates N1 and N2 of logic circuit 445 may be representative of one or more of the NAND-gates shown in FIG. 2. The devices in the logic circuit 445 may use the non-minimum width transistors and may represent a majority of the devices in the logic circuits 410.

However, there may be exceptions. More particularly, certain devices may not have the same timing constraints that other devices may have. Accordingly, these devices may be manufactured with the minimum gate width for the technology. As shown in FIG. 4, a portion of the logic circuits 410 is shown as circuit 415. Circuit 415 is a dynamic logic gate which is precharged when the CLK signal is low. The precharge value is held by the inverter I1 and the transistor T5. When the CK signal is high, the signals applied to the gates of transistors T2-T4 may be evaluated. In this circuit, the transistors in the inverter I1 and transistor T5 may be manufactured using the minimum width for the technology since these devices are in a feedback path (simply hold a precharge) and not the forward path, and thus do not have the same drive constraints as the forward path devices. Thus, the remaining devices should be manufactured using the non-minimum sized transistor width that is determined as described above in the description of FIG. 3.

Similarly, a small portion of the memory circuits 420 is shown in the circuit 425. As shown, the six-transistor cell includes transistors T6 and T7, which are the wordline transistors and the inverters I3 and I4, which correspond to the memory cell cross-coupled latch. In one embodiment, the transistors in the memory cell inverters I3 and I4 may be implemented using the minimum width transistors because the memory circuits 420 are not generally operated at very low operating voltages and due to the high packing density associated with the memory cells. However, the wordline transistors T6 and T7 may be implemented using the non-minimum width transistors, as desired.

Turning to FIG. 5, computer system 300 includes a plurality of workstations designated 512A through 512C. The workstations are coupled together through a network 516 and to a plurality of storages designated 518A through 518C. In one embodiment, each of workstations 512A-512C may be representative of any standalone computing platform that may include, for example, one or more processors, local system memory including any type of random access memory (RAM) device, monitor, input output (I/O) means such as a network connection, mouse, keyboard, monitor, and the like (many of which are not shown for simplicity).

In one embodiment, storages 518A-518C may be representative of any type of mass storage device such as hard disk systems, optical media drives, tape drives, ram disk storage, and the like. As such, the program instructions comprising the design tools may be stored within any of storages 518A-518C and loaded into the local system memory of any of the workstations during execution. As an example, as shown in FIG. 3, the logic synthesis tool 511, a simulation tool 513, and a place and route tool 514 are shown stored within storage 518A, the netlist 515 is stored within storage 518B, and the device library 517 and the device resizing tool 519 are stored within storage 518C. Additionally, the program instructions may be stored on a portable/removable storage media. The program instructions may be executed directly from the removable media or transferred to the local system memory or mass storages 518 for subsequent execution. As such, the portable storage media, the local system memory, and the mass storages may be referred to as non-transitory computer readable storage mediums. The program instructions may be executed by the one or more processors on a given workstation or they may be executed in a distributed fashion among the workstations, as desired.

It is noted that although the computer system shown in FIG. 5 is a networked computer system, it is contemplated that in other embodiments, each workstation may also include local mass storage. In such embodiments, the program instructions and the results of the design tools may be stored locally. Further, it is contemplated that the program instructions may be executed on a standalone computer such as a personal computer that includes local mass storage and a system memory.

Figure 6:
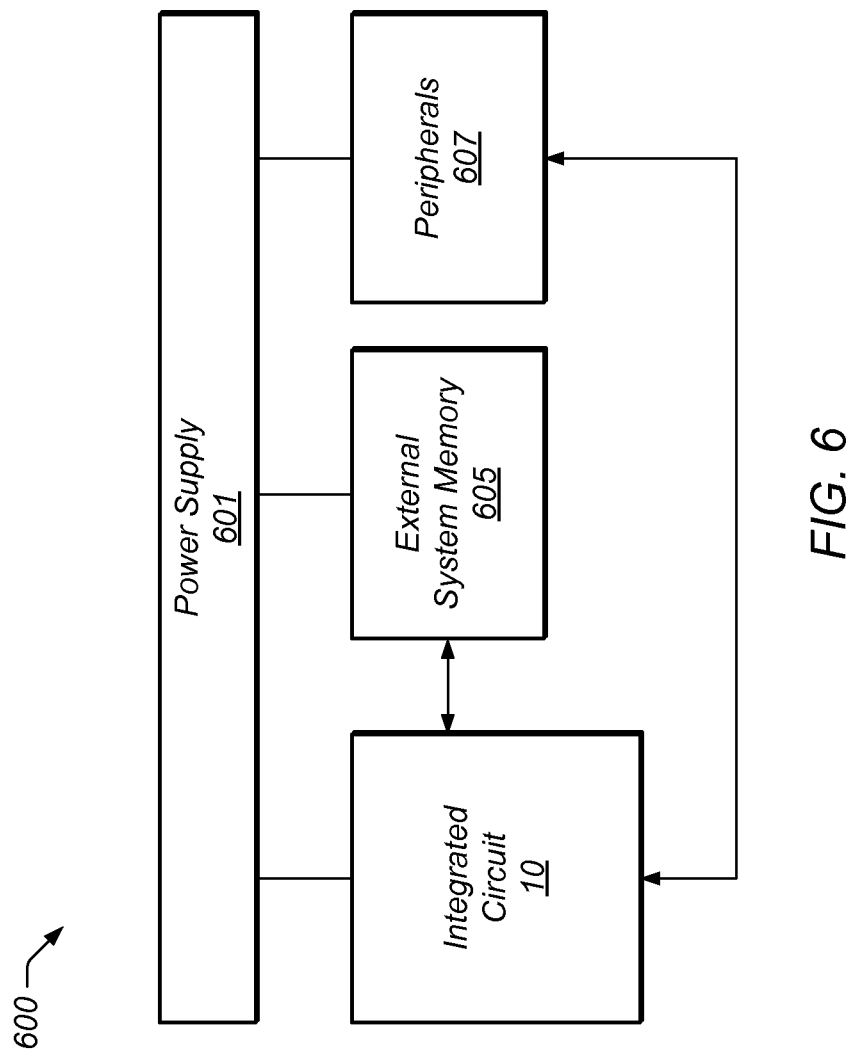
FIG. 6 is a block diagram of one embodiment of a system including the integrated circuit of FIG. 1 and FIG. 4.

Turning to FIG. 6, a block diagram of one embodiment of a system that includes the integrated circuit 10 of FIG. 1 and FIG. 4 is shown. The system 600 includes at least one instance of the integrated circuit 10 of FIG. 1 and FIG. 4 coupled to one or more peripherals 607 and an external system memory 605. The system 600 also includes a power supply 601 that may provide one or more supply voltages to the integrated circuit 10 as well as one or more supply voltages to the memory 605 and/or the peripherals 607. In some embodiments, more than one instance of the integrated circuit 10 may be included.

The peripherals 607 may include any desired circuitry, depending on the type of system. For example, in one embodiment, the system 600 may be included in a mobile device (e.g., personal digital assistant (PDA), smart phone, etc.) and the peripherals 607 may include devices for various types of wireless communication, such as WiFi, Bluetooth, cellular, global positioning system, etc. The peripherals 607 may also include additional storage, including RAM storage, solid-state storage, or disk storage. The peripherals 607 may include user interface devices such as a display screen, including touch display screens or multitouch display screens, keyboard or other input devices, microphones, speakers, etc. In other embodiments, the system 600 may be included in any type of computing system (e.g., desktop personal computer, laptop, tablet, workstation, net top, etc.).

The system memory 605 may include any type of memory. For example, the system memory 605 may be in the DRAM family such as synchronous DRAM (SDRAM), double data rate (DDR, DDR2, DDR3, etc.), or any low power version thereof. However, system memory 605 may also be implemented in SDRAM, static RAM (SRAM), or other types of RAM, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:

creating, by a processor, an integrated circuit device library including one or more cells, each cell having a plurality of transistors, wherein each transistor is specified to have a minimum transistor channel width determined by a manufacturing capability of a particular manufacturing facility within which the integrated circuit is manufactured;

characterizing the device library while varying process, voltage and temperature parameters;

synthesizing, by the processor, a hardware description language representation of a functional logic block including cells from the device library;

assessing timing, area, and power values for the functional logic block;

modifying the transistor channel width responsive to the assessing; and repeating the characterizing, synthesizing, assessing, and modifying to identify a particular transistor channel width for which the timing value of the functional logic block meets a timing goal and for which the area and power values are minimized among the attempted transistor channel widths;

wherein the modifying includes iteratively increasing the transistor channel width of at least a portion of the plurality of transistors of at least one of the cells in the device library to a transistor channel width that is larger than the a minimum transistor channel width, and repeating the characterizing, synthesizing, assessing to identify the particular transistor channel width;

wherein the portion of the plurality of transistors of the at least one of the library cells having a transistor channel width that is larger than the minimum transistor channel width correspond to transistors in a forward path of the cell.

2. The method as recited in claim 1, wherein another portion of the plurality of transistors of at least one of the one or more cells in the device library maintains the minimum transistor channel width determined by the manufacturing capability of the particular manufacturing facility.

3. The method as recited in claim 1, performing a static timing analysis to obtain timing values of the functional logic block, performing a place and route operation on a gate level representation of the functional block to determine the area values, and performing a circuit simulation on the gate level representation of the functional logic block to determine the power values.

4. The method as recited in claim 1, further comprising measuring rise and fall time for transitions of signals propagating through each cell of the one or more cells and obtaining mean and variability values while varying process, voltage and temperature parameters.

5. The method as recited in claim 1, wherein a remaining portion of the plurality of transistors of the at least one library cells includes a transistor width that is substantially the same as the minimum transistor channel width.

6. The method as recited in claim 5, wherein the remaining portion of the plurality of transistors of the at least one library cells having a transistor width that is substantially the same as the minimum transistor channel width correspond to transistors in a feedback circuit.

7. A non-transitory computer readable storage medium including program instructions executable by a processor to:
   create an integrated circuit device library including one or more cells, each cell having a plurality of transistors, wherein each transistor is specified to have a minimum transistor channel width determined by a manufacturing capability of a particular manufacturing facility within which the integrated circuit is manufactured;
   characterize the device library while varying process, voltage and temperature parameters;
   synthesize a hardware description language representation of functional logic block including cells from the device library;
   assess timing, area, and power values for the functional block;
   modify the transistor channel width responsive to the assessing; and
   repeat the characterizing, synthesizing, assessing, and modifying to identify a particular transistor channel width for which the timing value of the functional logic block meets a timing goal and for which the area and power values are minimized among the attempted transistor channel widths;
   wherein the modifying includes iteratively increasing the transistor channel width of at least a portion of the plurality of transistors of at least one of the cells in the device library to a transistor channel width that is larger than the a minimum transistor channel width, and repeating the characterizing, synthesizing, assessing to identify the particular transistor channel width;
   wherein the portion of the plurality of transistors of at least one of the library cells having a transistor channel width that is larger than the minimum transistor channel width correspond to transistors in a forward path of the cell.

8. The non-transitory computer readable storage medium as recited in claim 7, wherein a remaining portion of the plurality of transistors of the at least one library cells includes a transistor width that is substantially the same as the minimum transistor channel width.

9. The non-transitory computer readable storage medium as recited in claim 8, wherein the remaining portion of the plurality of transistors of the at least one library cells having a transistor width that is substantially the same as the minimum transistor channel width correspond to transistors in a feedback circuit.

* * * * *